United States Patent [19]

Maruyama et al.

[11] 4,223,386
[45] Sep. 16, 1980

[54] METHOD AND APPARATUS FOR ASSEMBLING TIRE WITH DISC WHEEL

[75] Inventors: Yuji Maruyama, Kure; Hirosi Mita, Hiroshima; Hiroshi Fukuyama, Higashimurayama; Yoshifumi Haraguchi, Kunitachi; Seiichi Aramaki, Akigawa, all of Japan

[73] Assignees: Bridgestone Tire Company Limited, Tokyo; Maruyama Seiki Kabushiki Kaisha, Kure, both of Japan

[21] Appl. No.: 26,705

[22] Filed: Apr. 3, 1979

[30] Foreign Application Priority Data

Apr. 3, 1978 [JP] Japan .................................. 53-39614

[51] Int. Cl.$^3$ ............................................. G01M 1/36
[52] U.S. Cl. ................................... 364/506; 364/508; 364/571; 73/462
[58] Field of Search ....................... 364/506, 508, 571; 73/462, 146

[56] References Cited

U.S. PATENT DOCUMENTS

| 4,015,480 | 4/1977 | Giers | 364/508 X |
| 4,018,087 | 4/1977 | Wenz | 364/508 X |
| 4,068,532 | 1/1978 | Green et al. | 364/508 X |
| 4,138,825 | 2/1979 | Pelta | 364/508 X |

*Primary Examiner*—Edward J. Wise
*Attorney, Agent, or Firm*—Sughrue, Rothwell, Mion, Zinn and Macpeak

[57] ABSTRACT

A method and apparatus for assembling a tire with a disc wheel under the optimum condition, in which inner diameter variation of the disc wheel, radial force variation of the tire proper, radial force variation of a wheel assembly body and existing assembled condition are displayed on separate channels of a display device, respectively. The radial force variation of the tire proper thus displayed is phase shifted by an angle at which the radial force variation of the wheel assembly body becomes minimum. The tire is then displaced with respect to the disc wheel by the above angle so as to obtain the optimum assembled condition.

2 Claims, 2 Drawing Figures

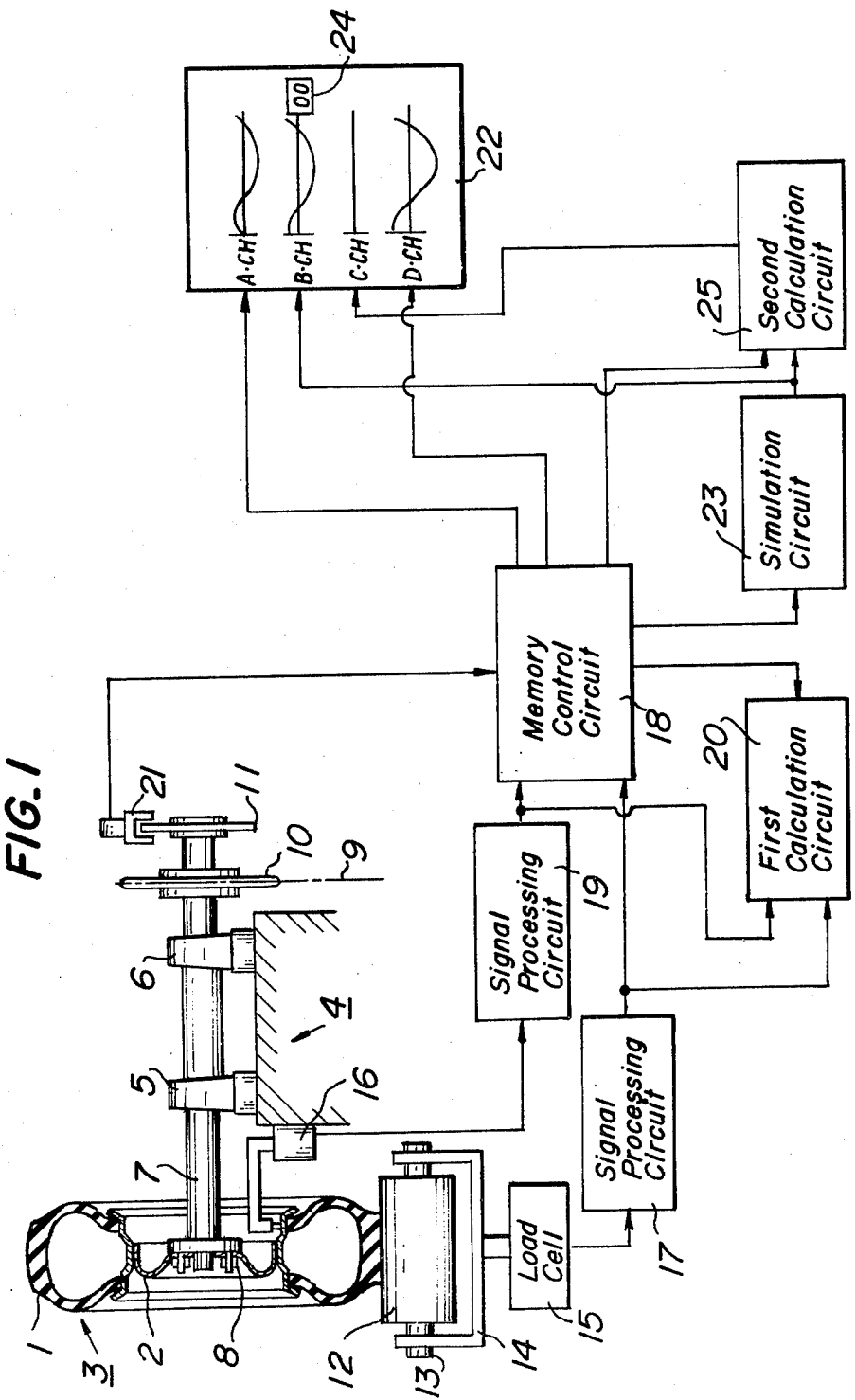

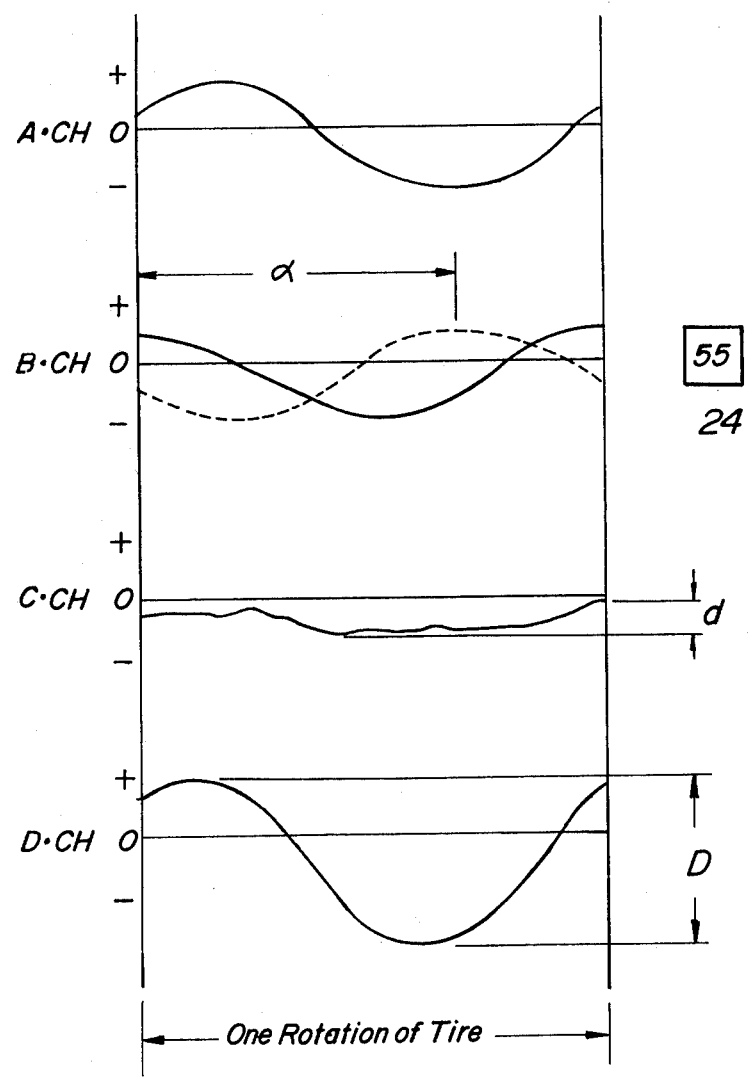

METHOD AND APPARATUS FOR ASSEMBLING TIRE WITH DISC WHEEL

BACKGROUND OF THE INVENTION

1. Field of the Invention

This invention relates to a method of assembling a tire with a disc wheel under the optimum condition and an apparatus for carrying out the same.

2. Description of the Prior Art

In a wheel assembly body composed of a tire and a disc wheel assembled together with each other for automobiles, it has been the common practice to specifically define the assembled condition for the purpose of eliminating the influence of oscillations due to the tire upon the automobile body when the tire is running, thereby preventing the automobile body from being subjected to the rotary oscillations.

In such conventional method of specifically defining the assembled condition, radial force variation of the tire and the inner diameter variation of that part of the disc wheel which is assembled with the tire are measured, respectively, before the tire is assembled with the disc wheel. In addition, the maximum point of the radial force variation of the tire and the minimum point of the inner diameter variation of the disc wheel are marked, respectively. Then, the tire is assembled with the disc wheel such that the maximum point mark of the radial force variation of the tire is brought into engagement with the minimum point mark of the inner diameter variation of the disc wheel.

Such conventional method of assembling the tire with the disc wheel is required to use a uniformity machine for measuring the radial force variation of the tire and a measuring mechanism for measuring the inner diameter variation of the disc wheel. As a result, such known method has the disadvantage that the measurement must be effected through two steps and hence requires a much time and labour.

As described above, in such known method, the tire is assembled with the disc wheel such that the maximum point mark of the radial force variation of the tire is brought into engagement with the minimum point mark of the inner diameter variation of the disc wheel. As a result, it is not always possible to assemble the tire with the disc wheel under the optimum condition depending on these two variations and eventually it is necessary to measure these two variations under the assembled condition in order to ascertain it.

The above described method is mainly used when the tire proper and the disc wheel proper are stored separately.

In order to determine whether or not the wheel assembly body used for automobiles is assembled under its optimum condition, it is always necessary to disassemble the wheel assembly body prior to the above mentioned respective measuring operations, thereby requiring a much time and labour.

SUMMARY OF THE INVENTION

An object of the invention, therefore, is to provide a method of assembling a tire with a disc wheel, which can rapidly determine the optimum assembled condition of a wheel assembly body and which can simply effect respective required measuring operations.

Another object of the invention is to provide an apparatus for assembling a tire with a disc wheel, which can easily determine the optimum assembled condition of a wheel assembly body and which is simple in construction and reliable in operation.

A feature of the invention is the provision of a method of assembling a tire with a disc wheel, comprising rotating a wheel assembly body composed of a tire and a disc wheel assembled with each other for several rotations under a loaded condition; electrically measuring and memorizing radial force variation of the wheel assembly body and inner diameter variation of a disc wheel proper during the rotation of the wheel assembly body; deriving radial force variation of a tire proper by subtracting the inner diameter variation of the disc wheel proper from the radial force variation of the wheel assembly body and memorizing the radial force variation of the tire proper; effecting an electrical simulation so as to relatively phase shift the inner diameter variation of the disc wheel proper and the radial force variation of the tire proper; determining the optimum assembled condition of the wheel assembly body by effecting a relative phase shift between the inner diameter variation of the disc wheel proper and the radial force variation of the tire proper and determining the amount of the relative phase shift; and correcting the assembled condition of the wheel assembly body on the basis of the amount of phase shift thus determined.

Another feature of the invention is the provision of an apparatus for assembling a tire with a disc wheel, comprising means for rotating a wheel assembly body composed of a tire and a disc wheel assembled with each other for several rotations under a loaded condition; means for electrically measuring and memorizing radial force variation of the wheel assembly body and inner diameter variation of a disc wheel proper during the rotation of the wheel assembly body; means for deriving radial force variation of a tire proper by subtracting the inner diameter variation of the disc wheel proper from the radial force variation of the wheel assembly body and memorizing the radial force variation of the tire proper; means for effecting electrical simulation so as to relatively phase shift the inner diameter variation of the disc wheel proper and the radial force variation of the tire proper; means for determining the optimum assembled condition of the wheel assembly body by effecting a phase shift between the inner diameter variation of the disc wheel proper and the radial force variation of the tire proper and determining the amount of the relative phase shift; and means for correcting the assembled condition of the wheel assembly body on the basis of the amount of phase shift thus determined.

Further objects and advantages of the invention will be fully understood from the following detailed description with reference to the accompanying drawings, in which:

BRIEF DESCRIPTION OF THE DRAWINGS

FIG. 1 is an elevational diagrammatic view of an apparatus for carrying out a process according to the invention, partly shown in section and a measuring system being shown in block diagrams; and FIG. 2 is a graph showing inner diameter variation of a disc wheel, radial force variation of a tire proper, phase shifted radial force variation of a wheel assembly body and existing radial force variation of the wheel assembly body as a function of one rotation of the tire displayed on A, B, C and D channels of a display device shown in FIG. 1, respectively.

DETAILED DESCRIPTION OF THE PREFERRED EMBODIMENTS

FIG. 1 shows essential parts of an apparatus for assembling a tire with a disc wheel according to the invention. Referring to FIG. 1, a tire 1 and a disc wheel 2 are assembled together in any assembled conditions to constitute a wheel assembly body 3. The wheel assembly body 3 is firmly secured by nuts 8 to one end of a rotary shaft 7 rotatably journaled in bearings 5, 6 mounted on a machine base 4 for constituting a measuring machine main body. The machine base 4 is partly shown in section and made stationary in the present embodiment. The rotary shaft 7 is provided near at its rear and with a sprocket wheel 10 adapted to be driven through an endless chain 9 from a driving mechanism (not shown). In addition, the rotary shaft 7 is provided at its rear end with a pulse generating plate 11 for determining a rotated angle of the wheel assembly body 3 to be described later.

Beneath the wheel assembly body 3 is arranged a load roll 12 adapted to be upwardly and downwardly moved with respect to the machine base 4. A rotary shaft 13 of the load roll 12 is rotatably supported at its both ends by a channel-shaped support member 14. To the support member 14 is secured a load cell 15 including a strain gauge and for measuring the above mentioned radial force variation of the wheel assembly body 3 and converting it into an electric signal.

The disc wheel 2 of the wheel assembly body 3 is provided at its inside with a measuring mechanism 16 including a pick-up which makes contact with a wheel rim and for measuring the inner diameter variation of the disc wheel 2 and converting it into an electric signal, a part of the measuring mechanism 16 being secured to the machine base 4. The measuring mechanism 16 is made movable for the purpose of easily securing the wheel assembly body 3 to the rotary shaft 7. In addition, the measuring mechanism 16 may be of any suitably selected one which can measure the inner diameter variation of the disc wheel 2 and convert it into an electric signal.

The radial force variation of the wheel assembly body 3 is measured by the load cell 15 and converted into the electric signal which is then supplied through a signal processing circuit 17 including an amplifier or the like to a memory control circuit 18 where it is stored. The inner diameter variation of the disc wheel 2 is measured by the measuring mechanism 16 and similarly converted into the electric signal, which is supplied through a signal processing circuit 19 including an amplifier or the like to the memory control circuit 18 where it is stored. The memory control circuit 18 includes an analog-digital converter, memory circuit and sequence control circuit for receiving a latch signal from the pulse generator 21 and stopping the rotation of the rotary shaft 7.

Besides, the radial force variation signal of the wheel assembly body 3 and the inner diameter variation signal of the disc wheel 2 are supplied from the respective signal processing circuits 17, 19 to a first calculation circuit 20 including a differential transformer and for subtracting the inner diameter variation signal from the radial force variation signal to obtain a radial force variation of the tire 1 proper, which is then delivered to and memorized by the memory control circuit 18. To the memory control circuit 18 is also supplied a pulse signal through a pulse generator 21 from the above mentioned pulse generating plate 11.

In the present embodiment, the pulse generator 21 is constructed such that it can generate 80 pulses everytime the tire is rotated.

After the wheel assembly body 3 has been rotated for several rotations, the existing radial force variation of the wheel assembly body 3, the radial force variation of the tire 1 proper and the inner diameter variation of the disc wheel 2, all of these variations being those for one rotation of the wheel assembly body 3, are displayed on D, B and A channels of a display device 22 such, for example, as an oscilloscope, cathode ray tube or the like, respectively.

The radial force variation of the tire 1 proper is displayed through a simulation circuit 23 on the B channel of the display device 22. The simulation circuit 23 may exteriorly be operated so as to phase shift the radial force variation of the tire 1 proper in succession. In addition, the amount of phase shift of the radial force variation of the tire 1 proper may digitally be displayed on a counter part 24 of the display device 22. The numerals displayed on the counter part 24 correspond to the above mentioned pulse signals and are composed of "00" to "79". With respect to the inner diameter variation of the disc wheel 2 displayed on the A channel of the display device 22, the simulation circuit 23 causes the radial force vatiation of the tire 1 proper displayed on the B channel of the display device 22 to be phase shifted in succession and the inner diameter variation of the disc wheel 2 and the phase shifted radial force variation of the tire 1 proper are supplied to a second calculating circuit 25 including an adder and effecting calculation and the result thereof is displayed on the C channel of the display device 22.

FIG. 2 shows display conditions of the display device 22 when the wheel assembly body 3 under any assembled condition is measured in practice. The existing radial force variation of the wheel assembly body 3 is displayed on the D channel by a curve having an amplitude D. The inner diameter variation of the disc wheel 2 is displayed on the A channel by a full line curve. In this case, the radial force variation of the tire 1 proper is derived through the first calculating circuit 20 in the way as described above and displayed on the B channel as shown by a full line curve.

Whether or not the assembled condition of the wheel assembly body 3 is the optimum one will be determined as follows. In one embodiment of an apparatus according to the invention shown in FIG. 1, the inner diameter variation of the disc wheel 2 is displayed on the A channel of the display device 22 and is remained as it is, but the radial force variation of the tire 1 proper is displayed on the B channel of the display device 22 and is phase shifted by operating the simulation circuit 23.

If the radial force variation of the tire 1 proper displayed on the B channel is phase shifted toward the right by operating the simulation circuit 23, the radial force variation of the wheel assembly body 3 is instantly displayed on the C channel through the second calculating circuit 25 in response to the rightward phase shift of the radial force variation of the tire 1 proper. As a result, it is possible to compare the radial force variation of the wheel assembly body 3 displayed on the C channel with that of the existing assembled condition displayed on the D channel.

That is, if the radial force variation of the tire 1 proper displayed on the B channel as shown by the full line curve is phase shifted by an amount α toward the right as shown by a dotted lines curve by operating the simulation circuit 23 and if the amplitude d of the radial force variation of the wheel assembly body 3 displayed on the C channel becomes minimum, then it is possible to determine that the radial force variation of the wheel assembly body 3 displayed on the C channel is better than that of the existing assembled condition displayed on the D channel.

In this case, the amount of phase shift α of the radial force variation of the tire 1 proper displayed on the B channel is given by "55" indicated by the counter part 24 of the display device. Then, the tire 1 under its deflated condition is rotated with respect to the disc wheel 2 and a phase plate surrounding the tire 1 and having a graduated scale by an angle which is equal to 360°/80×55 so as to obtain the optimum assembled condition.

In the above described embodiment, the radial force variation of the tire 1 proper is phase shifted with respect to the inner radial variation of the disc wheel 2 by operating the simulation circuit 23. Conversely, the inner radial variation of the disc wheel 2 may be phase shifted with respect to the radial force variation of the tire 1 proper by operating the simulation circuit 23.

As stated hereinbefore, a method according to the invention is capable of eliminating the drawbacks which have been encountered with the prior art techniques, that is, capable of rapidly deciding the optimum assembled condition of the tire with the disc wheel by a simple measuring operation. As a result, an apparatus according to the invention can be installed at a gasoline stand, tire repair shop or the like and is of significantly large utility value.

The invention is not limited to the above embodiments only, but various modification and alternations may be possible. For example, the maximum amplitude of the inner diameter variation of the disc wheel displayed on the A channel of the display device shown in FIG. 2 may be counteracted by the minimum amplitude of the phase shifted radial force variation of the tire 1 proper displayed on the B channel of the display device by the dotted lines curve shown in FIG. 2.

In this case, it is also possible to displace the tire 1 with respect to the disc wheel 2 so as to obtain the optimum assembled condition.

In addition, the radial force variation of the tire 1 proper displayed on the B channel as shown by the full line curve may be phase shifted by an amount α such that the total sum of areas |X| and |Y| defined by the radial force variation of the wheel assembly body 3 displayed on the C channel and having positive and negative amplitudes becomes minimum.

In the embodiment shown in FIG. 1, the radial force variation of the wheel assembly body 3 is measured by the load cell 15 without moving the rotary shaft 7 in a direction perpendicular thereto. Alternatively, the rotary shaft 7 may be moved in the direction perpendicular thereto together with the machine base 4. In this case, the measuring mechanism 16 is made integral with the rotary shaft 7 and the wheel assembly body 3 is made contact with the machine base 4 to which is connected the load cell 15. In addition, the load roll 12 may be driven by a driving mechanism. In this case, the wheel assembly body is made freely rotatable.

In addition, the image display device 22 may be replaced by a print display device.

What is claimed is:

1. A method of assembling a tire with a disc wheel, comprising the steps of rotating a wheel assembly body composed of a tire and a disc wheel assembled with each other for several rotations under a loaded condition; electrically measuring and memorizing radial force variation of the wheel assembly body and inner diameter variation of a disc wheel proper during the rotation of the wheel assembly body; deriving radial force variation of a tire proper by subtracting the inner diameter variation of the disc wheel proper from the radial force variation of the wheel assembly body and memorizing the radial force variation of the tire proper; effecting an electrical simulation so as to relatively phase shift the inner diameter variation of the disc wheel proper and the radial force variation of the tire proper; determining the optimum assembled condition of the wheel assembly body by effecting a relative phase shift between the inner diameter variation of the disc wheel proper and the radial force variation of the tire proper and determining the amount of the relative phase shift; and correcting the assembled condition of the wheel assembly body on the basis of the amount of phase shift thus determined.

2. An apparatus for assembling a tire with a disc wheel comprising means for rotating a wheel assembly body composed of a tire and a disc wheel assembled with each other for several rotations under a loaded condition; means for electrically measuring and memorizing radial force variation of the wheel assembly body and inner diameter variation of a disc wheel proper during the rotation of the wheel assembly body; means for deriving radial force variation of a tire proper by subtracting the inner diameter variation of the disc wheel proper from the radial force variation of the wheel assembly body and memorizing the radial force variation of the tire proper; means for effecting electrical simulation so as to relatively phase shift the inner diameter variation of the disc wheel proper and the radial force variation of the tire proper; means for determining the optimum assembled condition of the wheel assembly body by effecting a phase shift between the inner diameter variation of the disc wheel proper and the radial force variation of the tire proper and determining the amount of the relative phase shift; and means for correcting the assembled condition of the wheel assembly body on the basis of the amount of phase shift thus determined.

* * * * *